US010097323B2

(12) United States Patent
Chatterjee et al.

(10) Patent No.: US 10,097,323 B2
(45) Date of Patent: *Oct. 9, 2018

(54) UPLINK COORDINATED MULTI-POINT

(71) Applicant: Intel Corporation, Santa Clara, CA (US)

(72) Inventors: Debdeep Chatterjee, Mountain View, CA (US); Kamran Etemad, Potomac, MD (US); Rongzhen Yang, Shanghai (CN); Jong-Kae Fwu, Sunnyvale, CA (US); Apostolos Papathanassiou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,223

(22) Filed: Jan. 17, 2017

(65) Prior Publication Data

US 2017/0126375 A1    May 4, 2017

Related U.S. Application Data

(63) Continuation of application No. 14/812,927, filed on Jul. 29, 2015, now Pat. No. 9,591,638, which is a (Continued)

(51) Int. Cl.
*H04L 5/00* (2006.01)
*H04W 72/08* (2009.01)
(Continued)

(52) U.S. Cl.
CPC ......... *H04L 5/0035* (2013.01); *H04B 7/0623* (2013.01); *H04B 7/0626* (2013.01);
(Continued)

(58) Field of Classification Search
CPC ..... H04L 5/0035; H04L 5/005; H04B 7/0623; H04B 7/0626; H04W 48/16; H04W 52/0216; H04W 72/085; H04W 76/046
See application file for complete search history.

(56) References Cited

U.S. PATENT DOCUMENTS

| 2009/0245198 A1 | 10/2009 | Tiirola et al. |
| 2013/0114523 A1 | 5/2013 | Chatterjee et al. |
| 2014/0376486 A1 | 12/2014 | Lee et al. |

FOREIGN PATENT DOCUMENTS

| CN | 102026298 A | 4/2011 |
| CN | 102223215 A | 10/2011 |

(Continued)

OTHER PUBLICATIONS

International Search Report and Written Opinion for PCT/US2013/022935, dated May 27, 2013.

(Continued)

*Primary Examiner* — Melvin Marcelo
(74) *Attorney, Agent, or Firm* — Schwabe, Williamson & Wyatt, P.C.

(57) ABSTRACT

Disclosed embodiments may include an apparatus having one or more processors coupled to one or more computer-readable storage media. The one or more processors may be configured to transmit and/or receive channel state information reference signal (CSI-RS) resource configuration information, demodulation reference signals (DM-RS), uplink sounding reference signals (SRS), and power control parameters to support uplink coordinated multi-point (CoMP) operations. Other embodiments may be disclosed.

20 Claims, 4 Drawing Sheets

Related U.S. Application Data continuation of application No. 14/543,759, filed on Nov. 17, 2014, now Pat. No. 9,154,279, which is a continuation of application No. 13/536,722, filed on Jun. 28, 2012, now Pat. No. 8,917,618.

(60) Provisional application No. 61/591,641, filed on Jan. 27, 2012.

(51) Int. Cl.
    *H04B 7/06*     (2006.01)
    *H04W 48/16*     (2009.01)
    *H04W 52/02*     (2009.01)
    *H04W 76/04*     (2009.01)
    *H04W 76/27*     (2018.01)

(52) U.S. Cl.
CPC .............. *H04L 5/005* (2013.01); *H04W 48/16* (2013.01); *H04W 52/0216* (2013.01); *H04W 72/085* (2013.01); *H04W 76/046* (2013.01); *H04W 76/27* (2018.02)

(56) References Cited

FOREIGN PATENT DOCUMENTS

WO      2011/083068 A1      7/2011
WO      2013/025054 A2      2/2013

OTHER PUBLICATIONS

Office Action dated Feb. 10, 2015 from Australian Patent Application No. 2013212088.
Office Action dated Jul. 14, 2015 from Korean Patent Application No. 10-2014-7021091.
Supplemental Partial European Search Report dated Jul. 24, 2015 from European Patent Application No. 13741615.2.
Office Action dated Dec. 16, 2015 from Canadian Patent Application No. 2,861,484.
Extended European Search Report dated Dec. 12, 2015 from European Patent Application No. 13741615.2.
Office Action dated Jan. 21, 2016 from Korean Patent Application No. 10-2014-7021091.
International Preliminary Report on Patentability dated Aug. 7, 2014 from International Application No. PCT/US2013/022935.
Office Action dated Sep. 15, 2015 from Japanese Patent Application No. 2014-554823.
Examiner's Report dated Feb. 25, 2016 from Australian Divisional Application No. 2015230860, 3 pages.
Office Action dated Jun. 29, 2016 from Chinese Patent Application No. 201380006751.8, 18 pages.
Office Action dated Jun. 14, 2016 from Japanese Patent Application No. 2014-554823, 7 pages.
Office Action dated May 10, 2016 from Korean Divisional Application No. 10-2015-7025221, 8 pages.
Final Rejection dated Oct. 17, 2016 from Korean Divisional Application No. 10-2015-7025221, 5 pages.
Second Notice of Final Rejection dated Nov. 28, 2016 from Korean Patent Application No. 10-2014-7021091 , 4 pages.
Pantech, "Multiple CSI-RS Resource Configuration for CoMP", R1-113831, 3GPP TSG-RAN WG1 Meeting #67, San Francisco, USA, Nov. 14-18, 2011.
Sharp, "CSI-RS configuration of UL transmission", R1-113823, 3GPP TSG-RAN WG1 Meeting #67, San Francisco, USA, Nov. 14-18, 2011.
Ericsson et al. "Potential Enhancements for UL DMRS", R1-114253, 3GPP TSG-RAN WG1 Meeting #67, San Francisco, USA, Nov. 14-18, 2011.
Huawei et al., "Enhancements of SRS for UL CoMP", R1-113647, 3GPP TSG-RAN WG1 Meeting #67, San Francisco, USA, Nov. 14-18, 2011.
Alcatel-Lucent et al., On the need of SRS Enhancement of UL CoMP, R1-114052, 3GPP TSG-RAN WG1 Meeting #67, San Francisco, USA, Nov. 14-18, 2011.
LG Electronics, PUCCH resource management for UL CoMP, R1-113990, 3GPP TSG-RAN WG1 Meeting #67, San Francisco, USA, Nov. 14-18, 2011.
LG R1-113987, 'DM RS enhancements for UL CoMP', 3GPP TSG RAN WG1 Meeting #67, Nov. 14-18, 2011, pp. 1-5.
LG R1-113498, 'Uplink reference signals for CoMP', 3GPP TSG RAN WG1 Meeting #66bis, Nov. 10-14, 2011, pp. 1-5.
NTT Docomo et al. "UL RS Enhancement for LTE-Advanced," 3GPP TSG RAN WG1 Meeting #59, R1-094911 (Original R1-092801), Agenda Item: 7.4.1, Nov. 9-13, 2009, Jeju, Korea, 6 pages.
Ericsson et al., "Potential Enhancements for DMRS in Rel-11 ," 3GPP TSG RAN WG1 Meeting #66, R1-112086, Agenda Item: 6.7.1, Aug. 22-26, 2011, Athens, Greece, 6 pages.
Intel Corporation, "Discussion on uplink DM-RS enhancements for Release 11 ," 3GPP TSG-RAN WG1 #66, R1-112233, Agenda Item: 6.7.1, Aug. 22-26, 2011, Athens, Greece, 2 pages.
Panasonic, "Uplink enhancement for Rel.11 ," 3GPP TSG-RAN WG1 Meeting #66, R1-112367, Agenda Item: 6.7, Aug. 22-26, 2011, Athens, Greece, 4 pages.
Intel Corporation, "Views on standardization impact of UL CoMP," 3GPP TSG-RAN WG1 Meeting #66bis, R1-113208, Agenda Item: 7.5.4.1, Oct. 10-14, 2011, Zhuhai, China, 2 pages.
LG Electronics, "Uplink reference signals for CoMP," 3GPP TSG RAN WG1 Meeting #66bis, R1-113280, Agenda tem: 7.5.4.2, 10th-14th, 2011, Zhuhai, China, 2 pages.
Intel Corporation, "UL CoMP DM-RS Enhancements for Heterogeneous Networks," 3GPP TSG-RAN WG1 Meeting #67, R1-113665, Agenda Item: 7.5.4.1, Nov. 14-18, 2011, San Francisco, California, 8 pages.
3GPP, "RAN1 Chairman's Notes," 3GPP TSG RAN WG1 Meeting #66bis, Oct. 10-14, 2011, Zhuhai, China, 34 pages.
MCC Support, "Final Report of 3GPP TSG RAN WG1 #66bis v1.1.0," (Zhuhai, P.R. China, Oct. 10-14, 2011 ), 3GPP TSG RAN WG1 Meeting #67, R1-114352, Nov. 14-18, 2011, San Francisco, California, 84 pages.
LG Electronics, "Uplink reference signals for CoMP," 3GPP TSG RAN WG1 Meeting #66bis R1-113498, Agenda item: 7.5.4.2, Oct. 10-14, 2011, Zhuhai, China, 5 pages.
Intel Corporation, "Configuration and Signaling for UE-specific PUSCH DM-RS," 3GPP TSG-RAN WG1 Meeting #69, R1-122635, May 21-25, 2012, Prague, Czech, 5 pages.
Qualcomm Incorporated, "DM-RS configuration in support of downlink CoMP," 3GPP TSG-RAN WG1 #67, R1-114112, Nov. 14-18, 2011, San Francisco, USA, 4 pages.
3GPP, "Technical Specification Group Radio Access Network; Evolved Universal Terrestrial Radio Access (E-UTRA); Physical Channels and Modulation (Release 10)," 3GPP TS 36.211 V10A.0 (Dec. 2011), Lte Advanced, 101 pages.
LG Electronics, "Uplink reference signals for CoMP," 3GPP TSG RAN WG1 Meeting #66bis, R1-113498, Oct. 10-14, 2011, Zhuhai, China, 5 pages.
ZTE, "Uplink Reference Signal Enhancement for CoMP," 3GPP TSG-RAN WG1 #66bis, R1-113017, Oct. 10-14, 2011, Zhuhai, China, 5 pages.
Panasonic, "DMRS Enhancement for UL CoMP," 3GPP TSG-RAN WG1 Meeting #67, R1-113810, Nov. 14-18, 2011, San Francisco, USA, 6 pages.
CATT, "Considerations on UE-specific DM-RS configuration," 3GPP TSG RAN WG1 Meeting #67, R1-113732, Agenda Item: 7.5.2.11, Nov. 14-18, 2011, San Francisco, 3 pages.
Pantech, "Enhancement for PUCCH in Rel-11," 3GPP TSG RAN WG1 Meeting #69, R1-122454, Agenda item: 7.5.6.3, May 21-May 25, 2012, Prague, Czech Republic, 4 pages.
Samsung, "CoMP RRC Parameters," 3GPP TSG RAN WG1 #69, R1- 122243, Agenda item: 7.5.5, May 21-25, 2012, Prague, Czech Republic, 5 pages.
3GPP, Technical Specification Group Radio Access Network; Evolved Universal Terrestrial Radio Access (E-UTRA); Physical Channels and Modulation (Release 10), 3GPP TS 36.211 V10.4.0 (Dec. 2011), Dec. 20, 2011, Lte Advanced, 84 pages.

(56) References Cited

OTHER PUBLICATIONS

LG Electronics, "Discussion on signaling methods for CoMP," 3GPP TSG RAN WG1 Meeting #67, R1-113986, Nov. 14-18, 2011, San Francisco, 4 pges.
New Postcom, "Uplink reference signals for uplink CoMP," 3GPP TSG RAN WG1 Meeting #67, R1-113693, Agenda Item: 7.5.4.1, Nov. 14-18, 2011, San Francisco, USA, 6 pages.
3GPP, "Technical Specification Group Radio Access Network; Evolved Universal Terrestrial Radio Access (E-UTRA); Physical layer procedures (Release 10)," 3GPP TS 36.213 V10.4.0 (Dec. 2011), Dec. 15, 2011, 10 pages.
Office Action dated Jul. 22, 2016 from Korean Application No. 10-2014-7021091, 6 pages.
Office Action dated Aug. 19, 2016 from Canadian Patent Application No. 2,861,484, 3 pages.
Office Action dated Aug. 30, 2016 from Korean Divisional Application No. 10-2015-7025221, 6 pages.
Second Office Action dated Jan. 16, 2017 from Chinese Patent Application No. 201380006751.8, 8 pages.
Office Action dated Jan. 11, 2017 from Korean Divisional Application No. 10-2016-7037014, 7 pages.
Examination Report dated Jun. 28, 2017 from Australian Divisional Application No. 2016219696, 2 pages.
Notice of Final Rejection dated Jul. 6, 2017 from Korean Divisional Application No. 10-2016-7037014, 5 pages.
Third Office Action dated Jul. 3, 2017 from Chinese Patent Application No. 201380006751.8, 9 pages.
Examination Report dated Sep. 28, 2017 from Australian Divisional Application No. 2016219695, 6 pages.
Qualcomm Incorporated, "Uplink control signaling for CoMP," 3GPP TSG-RAN WG1 #67, R1-114118, Agenda Item: 7.5.4.3, 3 pages.
Fourth Office Action dated Jan. 10, 2018 from Chinese Patent Application No. 201380006751.8, 8 pages.
Article 94 issued Mar. 6, 2018 from European Patent Application No. 13741615.2, 7 pages.
LG Electronics, "Discussions on DMRS configuration for CoMP," 3GPP TSG RAN WG1 Meeting #67, R1-113984, Agenda Item: 7.5.2.1.1, Nov. 14-18, 2011, San Francisco, USA, 3 pages.
Notice of Preliminary Rejection dated Apr. 26, 2018 from Korean Divisional Application No. 10/2018-7003133, 9 pages.
Examination Report dated May 4, 2018 from Australian Divisional Application No. 2016219695, 4 pages.
Chinese Patent Office—Fourth Office Action dated Jun. 15, 2018 from Chinese Patent Application No. 201380006751.8, 8 pages.
Canadian Patent Office—Examiner's Report dated Aug. 7, 2018 from Canadian Divisional Application No. 2,986,418, 5 pages.

UPLINK COORDINATED MULTI-POINT

CROSS REFERENCE TO RELATED APPLICATIONS

The present application is a continuation of U.S. patent application Ser. No. 14/812,927, filed Jul. 29, 2015, entitled "UPLINK COORDINATED MULTI-POINT," which is a continuation of U.S. patent application Ser. No. 14/543,759, filed Nov. 17, 2014, entitled "UPLINK COORDINATED MULTI-POINT," which is a continuation of U.S. patent application Ser. No. 13/536,722, filed Jun. 28, 2012, entitled "UPLINK COORDINATED MULTI-POINT," which claims priority to U.S. Provisional Patent Application No. 61/591,641, filed Jan. 27, 2012, entitled "ADVANCED WIRELESS COMMUNICATION SYSTEMS AND TECHNIQUES." The entire disclosures of which are hereby incorporated by reference.

FIELD

Embodiments of the present invention relate generally to the field of communications, and more particularly, to uplink coordinated multi-point operation in wireless communication networks.

BACKGROUND INFORMATION

Coordinated multi-point (CoMP) is an interference avoidance concept that can be used to improve system spectral efficiency and cell edge user throughput performance. CoMP may be used to avoid interference to other cells by coordination of the transmissions across multiple eNBs.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Embodiments of the present disclosure may relate to uplink (UL) coordinated multi-point (CoMP) in wireless communication networks. In particular, embodiments of the present disclosure may relate to defining aspects of a control and signaling framework for operation of UL CoMP.

Various aspects of the illustrative embodiments will be described using terms commonly employed by those skilled in the art to convey the substance of their work to others skilled in the art. It will be apparent to those skilled in the art, however, that some alternate embodiments may be practiced using portions of the described aspects. For purposes of explanation, specific numbers, materials, and configurations are set forth in order to provide a thorough understanding of the illustrative embodiments. It will be apparent to one skilled in the art, however, that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
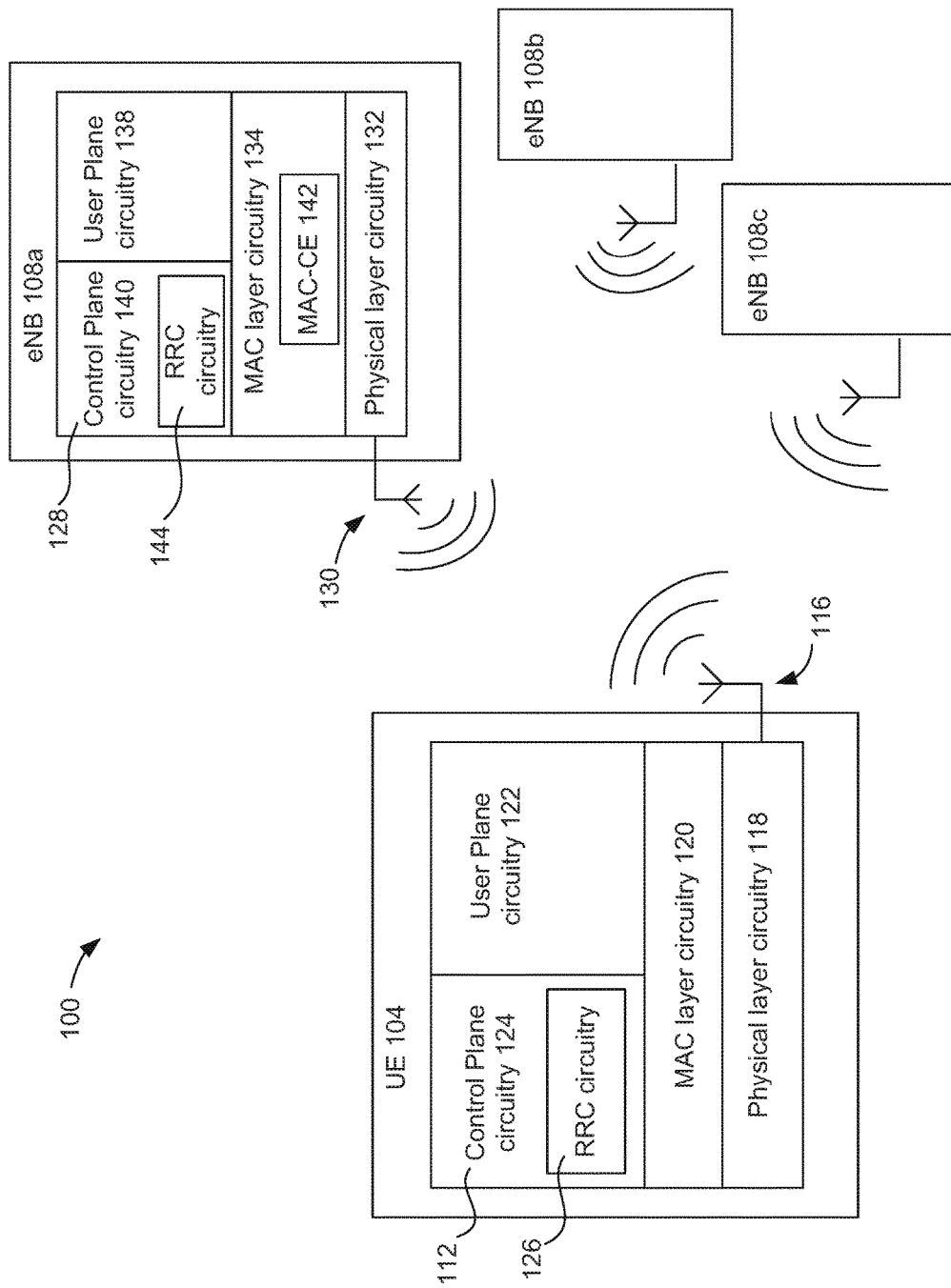
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). Network 100 may be configured to support uplink (UL) coordinated multipoint (CoMP) operation, for which there is presently no specification defined by the 3GPP standards body. The UL CoMP operations may include determining a UL CoMP cooperating set that may be a set of points intended to receive data from a UE. The UL CoMP cooperating set may be UE-specific and, if signaled to the UE, may be set or changed dynamically via radio resource control (RRC) or medium access control (MAC) signaling. The network 100 may include a mobile device or terminal, e.g., user equipment (UE) 104, configured to wirelessly communicate with a number of base stations, e.g., enhanced node base stations (eNB) 108a, 108b, and 108c (collectively 108). While embodiments of the present invention are described with reference to an LTE network, some embodiments may be used with other types of wireless access networks.

UE 104 and eNBs 108 may be configured to determine, provide, and/or receive control signaling and message signaling parameters to support UL CoMP operations in network 100. The control and message signaling parameters may include channel state information reference signals (CSI-RS) resource configuration parameters, open loop power control parameters, UL demodulation reference signals (DM-RS) parameters, sounding reference signal (SRS) parameters, and parameters related to physical uplink control channel (PUCCH) resource allocation. The configurations of UE 104 and eNBs 108 to enable determining, providing, and/or receiving of the parameters will be discussed below one parameter at a time.

UE 104 may include a communications module 112 coupled to one or more antennas 116. Communications module 112 may include physical layer circuitry 118 coupled to one or more antennas 116, MAC layer circuitry 120, user plane circuitry 122, control plane circuitry 124, and RRC circuitry 126. As shown, control plane circuitry 124 and user plane circuitry 122 may be communicatively coupled to physical layer circuitry 118 through MAC layer circuitry 120. In other words, MAC layer circuitry 120 may be an interface configured to communicate user plane signals and/or control plane signals to and/or from physical layer circuitry 118. Additionally, RRC circuitry 126 may be integrated into control plane circuitry 124.

eNBs 108 may collectively be configured as a UL CoMP cooperating set, and one or more eNBs 108 may be configured as an UL CoMP reception point (RP) set with respect to UE 104, according to various embodiments. A UL CoMP RP set may be a set of points that a may actively receive data from UE 104. The UL CoMP RP set may be a subset of a UL CoMP cooperating set. eNB 108a, may include a communications module 128, and one or more antennas 130. Communications module 128 may include physical layer circuitry 132, MAC layer circuitry 134, user plane circuitry 138, and control plane circuitry 138. Additionally, MAC layer circuitry 134 may include MAC control element (MAC-CE) circuitry 142, and control plane circuitry 140 may include RRC circuitry 144. Control plane circuitry 132 and user plane circuitry 138 may be communicatively coupled to physical layer circuitry 132 through MAC layer circuitry 134. In other words, MAC layer circuitry 134 may be an interface configured to communicate user plane signals and/or control plane signals to and/or from physical layer circuitry 132.

eNBs 108b and 108c may include similar features as eNB 108a to determine, provide, and/or receive control signaling and message signaling parameters to support UL CoMP operations in network 100.

CSI-RS resource configuration may include information on transmit power, periodicity, subframe offset, initialization seeds, and number of antenna ports available on UE 104 and/or eNBs 108. According to one embodiment, CSI-RS may include information to enable UE 104 to identify and select a particular point, e.g., reception point. eNB 108a may provide the CSI-RS resource configuration through the CoMP initialization process via control signaling. For example, eNB 108a may provide the CSI-RS resource configuration with RRC circuitry 144 through RRC signaling.

eNB 108a may be configured to assign an index to each CSI-RS resource in a CoMP Resource Management (CRM) set, when defined. The CRM set may be a set of CSI-RS resources for which CSI-RS based received signal measurements can be made and reported. eNB 108a may alternatively be configured to assign an index to each CSI-RS resource in a set of points that measure UE 104 UL transmissions for pathloss estimations. eNB 108a may assign the indices implicitly, based on the order of CSI-RSs included in a CSI-RS configuration message, or eNB 108 may assign a 3-4 bit index to each CSI-RS resource. According to embodiments, CSI-RS resource indices may be assigned as part of RRC configuration or initialization.

Alternatively, eNB 108a may assign an index to each CSI-RS resource based on an order of CSI-RSs included in a CSI-RS configuration message.

eNB 108a may be configured to reuse CSI-RS resource configuration of downlink CoMP. For example, eNB 108a may be configured to reuse the CSI-RS resource configuration of DL CoMP to facilitate the signaling and configuration information that supports UL CoMP. Alternatively, eNB 108a may independently incorporate the reused CSI-RS configuration during UL CoMP initiation. Further, eNB 108a may use the CSI-RS resource configuration to identify and signal additional UL parameters, as described below.

UE 104 and/or eNB 108a may be configured to identify each point in the UL CoMP cooperating set using the respective CSI-RS resource index of the point. Accordingly, respective CSI-RS resource indices may be used as a pointer to a particular CSI-RS resource during subsequent signaling. If eNB 108a assigns CSI-RS resource indices during RRC configuration, eNB 108 may explicitly or implicitly define the indices based on the order of CSI-RSs present in the corresponding RRC message. eNB 108 may similarly assign CSI-RS indices for DL and UL operations. However, the UL CoMP cooperating set, may be different from the DL CoMP CSI measurement set, according to various embodiments.

UE 104 and/or eNB 108 may be configured to select, determine, or update UL power control (PC) parameters based on a removal or addition of an RP to a CoMP RP set. An example of the UL PC parameter set may be defined TABLE 1, according to one embodiment.

TABLE 1

| | |
|---|---|
| ULCoMPConfigDedicated ::= | SEQUENCE { |
| csi-rs-ConfigList | CSI-RS-ConfigList, |
| p0-NominalPUSCH-ULCoMP | INTEGER (–126..24), |
| p0-NominalPUCCH-ULCoMP | INTEGER (–127..–96), |
| deltaFList-PUCCH-Dedicated | DeltaFList-PUCCH-Dedicated |
| } | |
| DeltaFList-PUCCH-Dedicated ::= | SEQUENCE { |
| deltaF-PUCCH-Format1 | ENUMERATED {deltaF-2, deltaF0, deltaF2}, |
| deltaF-PUCCH-Format1b | ENUMERATED {deltaF1, deltaF3, deltaF5}, |
| deltaF-PUCCH-Format2 | ENUMERATED {deltaF-2, deltaF0, deltaF1, deltaF2}, |
| deltaF-PUCCH-Format2a | ENUMERATED {deltaF-2, deltaF0, deltaF2}, |
| deltaF-PUCCH-Format2b | ENUMERATED {deltaF-2, deltaF0, deltaF2}, |
| deltaF-PUCCH-Format3-r10 | ENUMERATED {deltaF-1, deltaF0, deltaF1, deltaF2, deltaF3, deltaF4, deltaF5, deltaF6}, |
| deltaF-PUCCH-Format1bCS-r10 | ENUMERATED |

Each time an RP is added or removed/replaced in a CoMP RP set, UE 104 and/or eNB 108a may update or redefine the UL PC parameters, according to various embodiments of the disclosure.

According to a first embodiment, eNB 108a may set or determine the power control parameters in a dynamic RRC message, MAC message, or physical layer (PHY) message. According to embodiments, eNB 108a may set UL PC parameter and indicate the CoMP RP set in the same RRC, MAC, or PHY message. Setting the PC parameter in the same RRC, MAC, or PHY message as indicating the CoMP RP set may provide more flexibility than other techniques used to set PC parameters.

Control plane circuitry 124 of UE 104 may be configured to receive the RRC, MAC, or PHY message, and determine UL PC parameters for UE 104 based on the message.

UL PC parameters may be cell specific and semi-static. Therefore, according to a second embodiment, eNB 108a may be configured to generate a list or set of UL PC parameter sets applicable to different combinations of RPs. eNB 108a may generate the list or set of UL PC parameter sets based on the CSI-RS resource indices of the points. RRC circuitry 126 of UE 104 may then receive the list or set of UL PC parameter sets via RRC messaging. The list or set of UL PC parameter sets may be subsequently updated by MAC signaling, e.g., between MAC layer circuitry 134 to MAC layer circuitry 120 or between MAC-CE circuitry 142 to MAC circuitry 120. Through MAC layer dynamic signaling of the CoMP RP set, control plane circuitry 124 of UE 104 may apply the updated UL PC parameters.

If a small number of RP sets are allowed for joint reception or if coordinated scheduling and beamforming (CS/CB) base UL CoMP is used, generating lists or sets of UL PC parameter sets by eNB 108a may be more efficient than setting UL PC parameters in the same dynamic message used to indicate the CoMP RP set.

Advantageously, referencing the UL PC parameters with CSI-RS resource indices of the points in the CoMP RP set may enable UE 104 to determine pathloss information using average received power measured by UE 104 on CSI-RS. Based on the optimality-signaling overhead tradeoff, it may be sufficient to semi-statically signal the CSI-RS resource index of only the preferred RP via RRC layer, especially in low-mobility scenarios. In embodiments, low-mobility scenarios include speeds that are approximately 3 km/h and less.

If eNB 108a configures the UL PC parameters and pathloss offset values in a UE-specific manner, control plane circuitry 124 of UE 104 may directly receive UL PC parameters and pathloss offset values by the signaling of the appropriate indices in the list(s) of UL PC parameters and pathloss offset values via RRC, MAC, or PHY messaging by the eNB 108a.

The parameters for UL DM-RS include parameters that may enable UE 104 to choose a base sequence, cyclic shift (CS), and orthogonal cover code (OCC) for a DM-RS sequence for the UE 104.

If the DM-RS sequence assignments to be used for UL CoMP are UE-specific, control plane circuitry 140 may assign both base sequences and CSs in a UE-specific manner. To support UE-specific configuration of DM-RS sequences, eNB 108a may configure a limited number of base sequences at the cell level instead of each cell being associated with only one base sequence. There may be overlap between the sets of base sequences associated with different points in the CRM set. As a result, eNB 108a may dynamically assign scheduled UEs, such as UE 104, a base sequence from the set of base sequences for this CRM set. eNB 108a may dynamically assign the scheduled UEs based on scheduling decisions made at eNB 108a.

eNB 108a may semi-statically, e.g., at the RRC level, configure a super set of base sequences through broadcast or dedicated signaling. Note that, according to the LTE Rel-10 specifications, the cell-specific base sequences are derived using the physical cell-ID (PCI). The RRC configuration of this set of base sequences can also be based on the use of cell-IDs.

According to various embodiments, eNB 108a may reserve virtual cell-IDs (VCIDs) for the calculation of base sequence seeds used to derive the base sequences, group hopping patterns, and sequence hopping patterns. Alternatively, eNB 108a may rely on RRC configurations that directly list the value of seeds to be used to derive the base sequences, group hopping, and sequence hopping patterns. According to embodiments, no dynamic indication of DM-RS sequences (described below) would be necessary if eNB 108a configures a single VCID instead of the super set of VCIDs/base sequence seeds via semi-static RRC signaling.

For dynamic indication of DM-RS sequences, eNB 108a may use MAC-CE circuitry 142 to signal the dynamic selection of the seed/VCID to be used by UL CoMP for a given UE. eNB 108a may combine dynamic selection of the seed/virtual cell-IDs with MAC-CE messaging used for UL PC setting. eNB 108a may use physical layer circuitry 132 to signal dynamic selection of the seed/virtual cell-IDs through Downlink Control Information (DCI) carried by the Physical Downlink Control Channel (PDCCH) using an explicit or implicit index, e.g. using some pre-defined order, to the seed/VCID in the configuration message.

eNB 108a and UE 104 may be configured to determine a value of CS for the UL DM-RS. eNB 108a and UE 104 may derive the CS based on three parameters: $n(1)DMRS$, $n(2)DMRS,\lambda$, $nPN(ns)$. $n(1)DMRS$ is a CS parameter that is specified by a parameter named cyclicshift (specified according to Table 5.5.2.1.1-2 of 3GPP TS 36.211) which may be provided by higher layers, such as MAC and RRC, as in LTE Rel-10 (non-CoMP) operation. $n(2)DMRS,\lambda$ is a CS parameter that may indicate the CS and OCC to be used by the UE 104 to generate the DM-RS sequence to be transmitted. eNB 108a may signal $n(2)DMRS,\lambda$ via the most-recent uplink related DCI for the transport block associated with the corresponding physical uplink shared channel (PUSCH) transmission and which can be included in the physical downlink control channel (PDCCH), as is done in Rel-10 (non-CoMP) operation. $nPN(ns)$ is a CS parameter that defines slot-by-slot hopping mechanism between the CSs used by UE 104, and is derived from the physical cell ID according to Rel-10 specifications. The application of $nPN(ns)$ may depend on the same seed/VCID used for the derivation of the base sequence or may be signaled by the eNB 108a, independent of the seed/VCID used for derivation of the base sequence. Additionally, to increase the user capacity of UL DM-RS for UL CoMP, the number of CSs that can be signaled by UE 104 or/and eNB 108a may be extended from 8 to a higher number, e.g., 12, by using one extra bit in the DCI.

If OCC is employed by eNB 108a to multiplex UL DM-RS transmissions, the OCC information may be configured in a UE-specific manner via the $n(2)DMRS,\lambda$ parameter and may be communicated to the UE dynamically through the DCI carried by the PDCCH, as in Rel-10 (non-CoMP) operation.

IF eNB 108a employs a UE-specific assignment of SRS base sequences, eNB 108a may be configured to signal the SRS parameters in a manner similar to that described for UE-specific UL DM-RS. In other words, eNB 108a may signal SRS parameters with a combination of semi-static settings for a limited set of choices using broadcast/unicast RRC signaling followed by UE-specific dynamic setting at the RRC or MAC messaging level. Similar to the case of UE-specific DM-RS, dynamic signaling may not provide added benefit if only a single choice of SRS base sequence (based on explicit RRC signaling of the seed or VCID) is configured semi-statically via RRC. To increase user capacity of SRS for efficient UL CoMP operation, the number of CSs that can be signaled may be extended from 8 to a higher number, e.g., 16, by using one extra bit in the DCI.

UL PC parameters for SRS transmission may be selected based on the UL CoMP cooperating set and in a similar manner as described earlier for the signaling of the UL PC parameters (for PUSCH/PUCCH transmission) with the signaling of the CSI-RS resource indices corresponding to the UL CoMP cooperating set. For SRS PC purposes, it may be sufficient to semi-statically signal, via RRC layer circuitry 126 and 144, only the preferred CSI-RS resource index for pathloss information to be used by the UE for open loop power control (OLPC) for SRS.

PUCCH resource allocation parameters may include UE-specific ACK/NACK resource offset (N(1)PUCCH) for dynamic resource indication for PUCCH format 1a/1b, wherein N(1)PUCCH indicates the starting location of dynamic ACK/NACK. UE-specific ACK/NACK resource offset signaling may reduce potential collisions at the pico-cell during times when UE 104 receives downlink information from a macro-cell, e.g., eNB 108b, while transmitting uplink information to a pico-cell, e.g., eNB 108a. PUCCH resource allocation parameters may include the configuration of the UL CoMP cooperation set in a UE-specific way. Further, the eNB 108a may signal VCID values to generate PUCCH base sequences in a UE-specific way via RRC layer circuitry 144 in order to achieve gains from better interference orthogonalization between PUCCH transmissions by UEs in neighboring cells within the CoMP set and/or from area splitting gains in scenarios wherein a number of low power nodes (LPNs) share the same cell identity with a macro node as in CoMP Scenario 4 (as defined in 3GPP TR 36.819). According to various embodiments, the values for the VCID or base sequence seeds for PUSCH DM-RS, PUCCH, and SRS may be independent.

Figure 2:
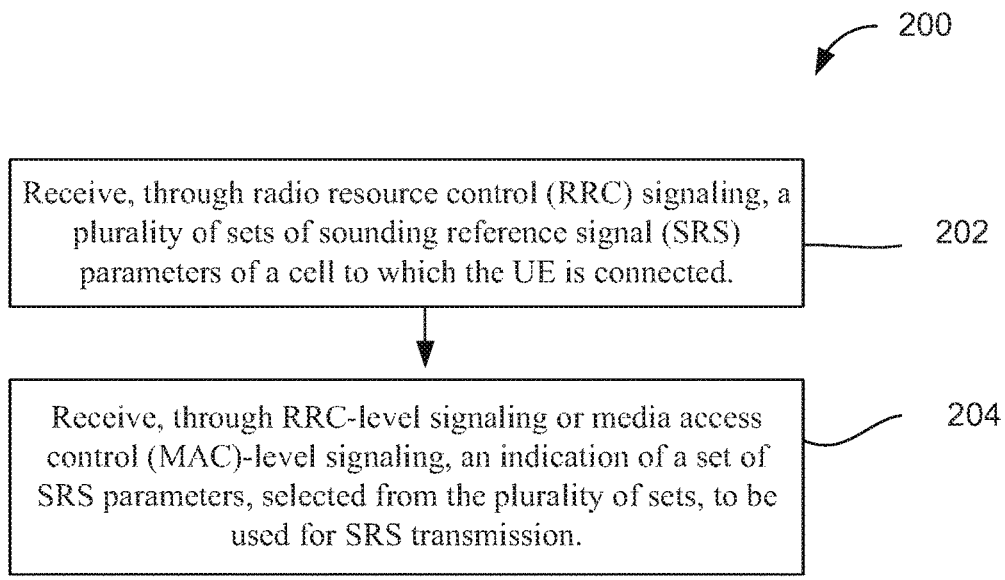
FIG. 2 illustrates a flow diagram of signaling UE-specific SRS parameters in accordance with various embodiments.

FIG. 2 illustrates a flow diagram 200 of signaling UE-specific SRS parameters according to embodiments.

At block 202, a UE may receive, through RRC signaling, a plurality of sets of SRS parameters of a cell to which the UE is connected. The plurality of sets of SRS parameters may be broadcast or may be unicast by the cell.

At block 204, a UE may receive, through RRC-level signaling or media access control (MAC)-level signaling, an indication of a set of SRS parameters, selected from the plurality of sets, to be used for SRS transmission. Receipt of the indication of the set of SRS parameters may enable the UE to operate efficiently by enabling the UE to select from a finite set of parameters in place of causing the UE to determine the SRS parameters based on other information.

According to embodiments, the eNB may be configured to signal more than eight cyclic shift values to increase capacity of SRS in UL CoMP operation. The eNB may also be configured to semi-statically determine and signal a preferred one of a number of RPs that may be indicated by a certain CSI-RS index. Semi-statically signaling a preferred RP may enable the UE to obtain pathloss information that may be used by the UE to determine open loop power control parameters for SRS transmissions. The UE may receive CSI-RS indices from the eNB and may semi-statically determine a respective CSI-RS index of the preferred one of a number of RPs of an UL CoMP cooperating set based on an RRC message from the eNB.

According to other embodiments, a UE may be enabled or configured to adjust power control parameters of SRS transmissions based on a UL CoMP cooperating set. The UE may adjust the power control parameters corresponding to a plurality of CSI-RS resource indices signaled by the eNB that may correspond to the UL CoMP cooperating set.

Figure 3:
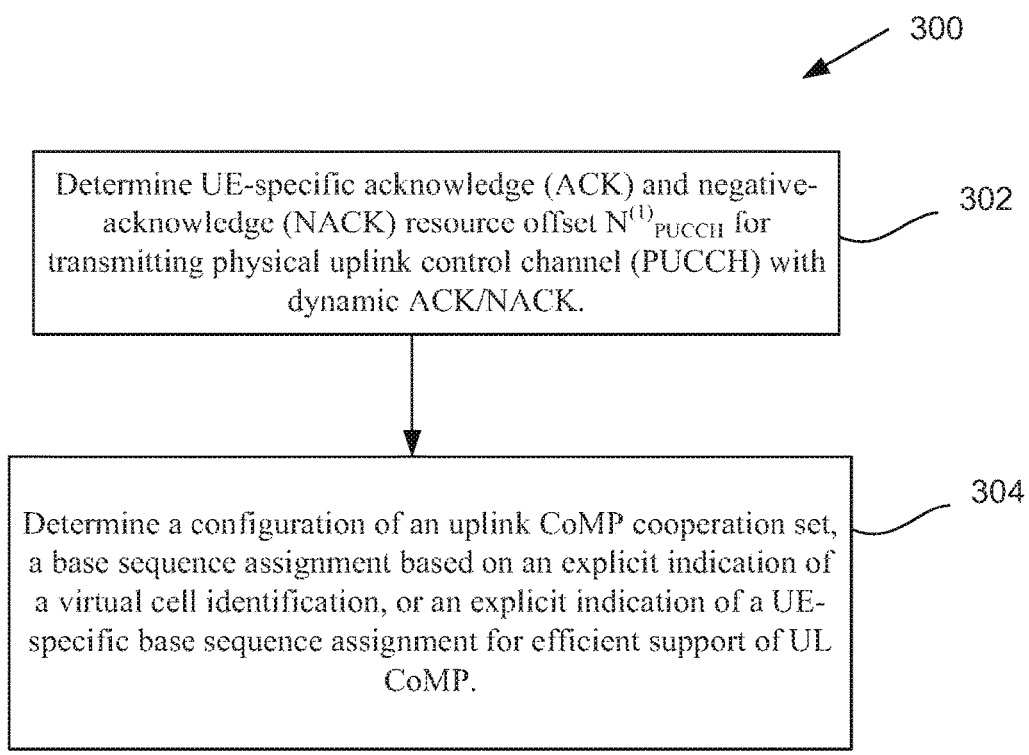
FIG. 3 illustrates a flow diagram of physical uplink control channel (PUCCH) resource allocation and PUCCH sequence assignment for efficient support of UL CoMP in accordance with various embodiments.

FIG. 3 illustrates a flow diagram 300 of PUCCH resource allocation and PUCCH sequence assignment for efficient support of UL CoMP.

At block 302, a UE may be configured to determine UE-specific ACK/NACK resource offset N(1)PUCCH for transmitting PUCCH with dynamic ACK/NACK, e.g., PUCCH formats 1a/1b as specified in 3GPP TS 36.211.

At block 304, a UE may be configured to determine a configuration of an uplink CoMP cooperation set, a base sequence assignment based on an explicit indication of a virtual cell identification, or an explicit indication of a UE-specific base sequence assignment to support UL CoMP with better inter-point interference mitigation and/or with area splitting gains.

Figure 4:
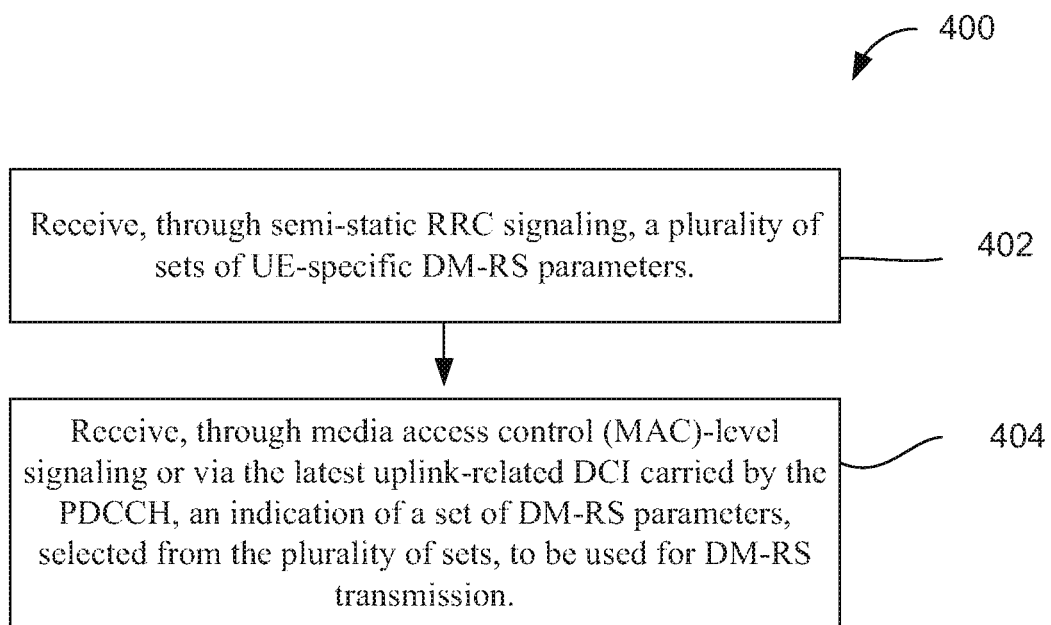
FIG. 4 illustrates a flow diagram of signaling UE-specific UL DM-RS parameters in accordance with various embodiments.

FIG. 4 illustrates a flow diagram 400 of signaling UE-specific UL DM-RS parameters according to embodiments.

At block 402, a UE may receive, through semi-static RRC signaling, a plurality of sets of UE-specific DM-RS parameters. The plurality of sets of SRS parameters may be broadcast or may be unicast by the cell.

At block 404, a UE may receive, through media access control (MAC)-level signaling or via the latest uplink-related DCI carried by the PDCCH, an indication of a set of DM-RS parameters, selected from the plurality of sets, to be used for DM-RS transmission. According to embodiments, the dynamic signaling may not provide additional benefit if only a single set of UE-specific DM-RS parameters is semi-statically signaled at RRC layer.

Figure 5:
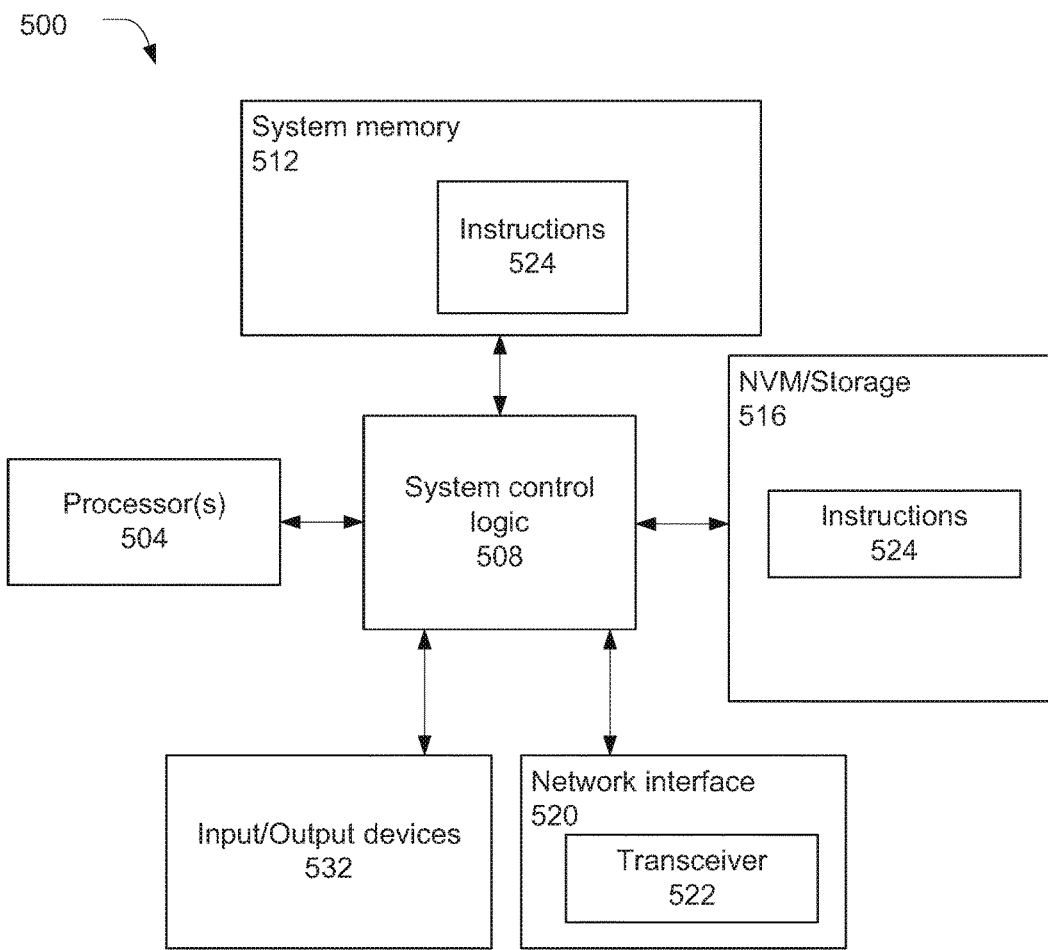
FIG. 5 schematically depicts an example system in accordance with various embodiments.

UE 102 and eNB 104 described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, and a network interface 520 coupled with system control logic 508.

Processor(s) 504 may include one or more single-core or multi-core processors. Processor(s) 504 may include any combination of general-purpose processors and dedicated processors (e.g., graphics processors, application processors, baseband processors, etc.). In an embodiment in which the system 500 implements UE 104, processors(s) 504 may be included in communication module 112. In an embodiment in which the system 500 implements eNB 108, processor(s) 504 may be included in communications module 128. According to various embodiments, processor(s) 504 and system memory 512 may be configured as user plane circuitry 122, control plane circuitry 124, and/or RRC circuitry 126. According to various embodiments, processor(s) 504 and system memory 512 may be configured as user plane circuitry 138, control plane circuitry 140, and/or RRC circuitry 144.

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520.

System memory 512 and NVM/storage 516 may respectively include, in particular, temporal and persistent copies of instructions 524. Instructions 524 may include instructions that when executed by at least one of the processor(s) 504 result in the system 500 implementing a one of the methods FIGS. 2-4, described herein. In some embodiments, instructions 524, or hardware, firmware, and/or software components thereof, may additionally/alternatively be located in the system control logic 508, the network interface 520, and/or the processor(s) 504.

Network interface 520 may have a transceiver 522 to provide a radio interface for system 500 to communicate over one or more network(s) and/or with any other suitable device. The transceiver 522 may be implemented at part of physical layer circuitry 118 or 132. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interface. Network interface 520 for one embodiment may include, for example, a network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

The system 500 may further include input/output (I/O) devices 532. The I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, system 500 may have more or less components, and/or different architectures.

According to various embodiments, an apparatus may include one or more computer-readable storage media configured to store a number of instructions. The apparatus may include one or more processors coupled to the one or more computer-readable storage media. The one or more processors, in response to executing the number of instructions, may be configured to receive channel state information reference signal (CSI-RS) resource configuration information; determine a number of CSI-RS indices based on the CSI-RS configuration information; and identify a number of points of an uplink coordinated multi-point (CoMP) cooperating set based on the number of CSI-RS indices. The one or more processors and one or more computer-readable media may be configured as control-plane circuitry of the apparatus. The CSI-RS resource configuration information may be received by radio resource control (RRC) circuitry of the control-plane circuitry as part of a CoMP initialization process.

In embodiments, the CSI-RS resource configuration information may include transmission parameters associated with CSI-RS. The transmission parameters may include transmit power, periodicity, subframe offset, initialization seeds, and/or number of utilized antenna ports. The number of CSI-RS indices may be included in the CSI-RS configuration information, or the one or more processors may be configured to determine the number of CSI-RS indices based on an order of CSI-RSs included in the CSI-RS resource configuration information.

In embodiments, the one or more processors may be configured to receive a message; determine, based on the message, a CoMP reception point (RP) set that may include a subset of the points of the CoMP cooperating set that are to receive an uplink data transmission from the apparatus; and determine, based on the message, uplink power control parameters. The one or more processors may be further configured to receive a number of uplink power control parameter sets that may respectively correspond to a number of CoMP RP sets; and determine the uplink power control parameters based on the uplink power control parameter set that may correspond to the CoMP RP set. The uplink power control parameters may be included in the message. The uplink power control parameters may include a target signal to noise ratio and $\alpha$, wherein $\alpha$ may be a fractional power control parameter.

In embodiments, the one or more processors may be further configured to determine pathloss information based on a message fed back from one or more points of the CoMP cooperating set. The one or more processors may be further configured to determine the pathloss information based on an average received power of the CSI-RS information, as measured by the apparatus. The one or more processors may be further configured to semi-statically determine the respective CSI-RS index of a preferred one of the number of points of the uplink CoMP cooperating set received via an RRC message, wherein the preferred one of the number of points is configured to actively receive data from the apparatus. The one or more processors may be further configured to derive a number of base sequences, group hopping patterns, and/or sequence hopping patterns from one or more virtual cell identifications.

According to embodiments, the one or more processors may be configured to receive a list of uplink power control parameter sets that respectively correspond to receive point sets; determine a reception point set, which is may be subset of the uplink CoMP cooperating set; determine an uplink power control parameter set that may correspond to the reception point set; and control transmission of uplink signals to the reception point set based on the uplink power control parameter set.

According to various embodiments, an eNodeB may include one or more computer-readable media configured to store a number of instructions; and one or more processors coupled to the one or more computer-readable media. In response to executing the number of instructions, the one or more processors may be configured to support user equipment (UE)-specific configuration of uplink demodulation reference signals (DM-RS). The one or more processors may be configured to configure a number of base sequences at a cell-level; determine communication schedules of one or more UEs; and dynamically assign respective base sequences from the number of base sequences to the one or more UEs based on the determined communication schedules. The number of base sequences may be associated with a particular coordinated multipoint (CoMP) resource management (CRM) set. The uplink DM-RS may include parameters that enable each of the one or more UEs to select one of the number of base sequences, cyclic shift (CS) hopping pattern, group hopping pattern, sequence hopping pattern, a cyclic shift, and an orthogonal cover code (OCC) to determine respective DM-RS sequences that may be associated with respective ones of the one or more UEs. The number of base sequences may be configured semi-statically with radio resource control (RRC) level broadcast signaling or RRC level dedicated signaling.

In embodiments, the one or more processors may be further configured to signal dynamic selection of one of a number of virtual cell identifications through a media access control-control element (MAC-CE). The one or more virtual cell identifications may enable derivation of the number of base sequences. The one or more processors may be configured to combine dynamic selection of the one of the number of virtual cell identifications with MAC-CE messaging used to set uplink power control parameters. The one or more processors may be configured to signal dynamic selection of the one of the number of virtual cell identifications, in downlink control information (DCI) carried by a physical downlink control channel (PDCCH), with indices assigned to the one or more virtual cell identifications. The one or more processors may be further configured to signal one of 8 or more cyclic shift values associated with the uplink DM-RS. The one or more processors may be configured to signal one of 8 or more cyclic shift values to increase capacity of SRS in uplink CoMP operation.

In embodiments, the one or more processors may be configured to semi-statically signal a preferred one of a number of reception points indicated by a corresponding one of a number of channel state information resource signals (CSI-RS) indices to obtain pathloss information that may be usable by the one or more UEs for open loop power control for SRS transmissions. The one or more processors may be configured to adjust power control parameters of SRS transmissions based on an uplink CoMP cooperating set with signals to a number of CSI-RS resource indices that correspond to the uplink CoMP cooperating set.

According to various embodiments, one or more computer readable media having instructions which, when executed by a processor of a user equipment (UE), may enable the UE to receive, through radio resource control (RRC) signaling, a number of sets of sounding reference signal (SRS) parameters of a cell to which the UE is connected. The instructions may enable the UE to receive, through RRC-level signaling or media access control (MAC)-level signaling, an indication of a set of SRS parameters, selected from the number of sets, to be used for SRS transmission. The number of sets may be broadcast or unicast by the cell. The instructions may further enable the UE to adjust power control parameters of SRS transmissions based on an uplink cooperating multipoint (CoMP) cooperating set with signals to the number of CSI-RS resource indices that correspond to the uplink CoMP cooperating set.

According to various embodiments, one or more computer-readable media having instructions which, when executed by a processor of an eNodeB, may enable the eNodeB to support coordinated multipoint (CoMP) operations and may enable the eNodeB to determine UE-specific acknowledge (ACK) and negative-acknowledge (NACK) resource offsets N(1)PUCCH for dynamic resource allocation of physical uplink control channel (PUCCH) carrying dynamic ACK/NACK, and transmit the ACK/NACK resource offset N(1)PUCCH to a respective UE. The instructions may enable the eNodeB to determine the UE-specific ACK/NACK resource offset N(1)PUCCH for PUCCH formats 1a and 1b. The PUCCH formats 1a and 1b may use a physical cell ID. The instructions may enable the eNodeB to transmit a different virtual cell ID index for each PUCCH format used by a UE.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A user equipment (UE), comprising:
   first circuitry to:
      identify a virtual cell identity based on a received indicator of the virtual cell identity, the virtual cell identity dynamically selected for association with an evolved universal mobile telecommunication system terrestrial radio access network (E-UTRAN), the virtual cell identity different from a physical layer cell identity corresponding to a cell of the E-UTRAN; and
      identify a seed based on a received indicator of the seed, the seed being different than the virtual cell identity and the physical layer cell identity; and second circuitry to:
  generate a demodulation reference signal parameter based on the virtual cell identity; and
  determine a cyclic shift for a demodulation reference signal based on the seed.

2. The UE of claim 1, wherein to generate the demodulation reference signal parameter includes to:
  determine one or more parameters based on the virtual cell identity; and
  generate the demodulation reference signal parameter based on the one or more parameters.

3. The UE of claim 2, wherein the one or more parameters include a base sequence.

4. The UE of claim 1, wherein to determine the cyclic shift for the demodulation reference signal includes to:
  derive the cyclic shift based on a cyclic shift parameter that depends on the seed.

5. The UE of claim 1, wherein the second circuitry is to further generate the demodulation reference signal based on the demodulation reference signal parameter.

6. The UE of claim 1, wherein:
  the first circuitry is to further receive a cyclic shift hop initialization value; and
  the second circuitry is to further generate a cyclic shift for a demodulation reference signal by initializing a pseudo-random sequence generator with the cyclic shift hop initialization value.

7. The UE of claim 1, wherein the seed is independent from the virtual cell identity and the physical layer cell identity.

8. An evolved NodeB (eNB), comprising:
  first circuitry to:
    dynamically select a virtual cell identity for association with an evolved universal mobile telecommunication system terrestrial radio access network (E-UTRAN), the virtual cell identity different from a physical layer cell identity corresponding to a cell of the E-UTRAN; and
    select a seed, the seed being different than the virtual cell identity and the physical layer cell identity; and
  second circuitry to:
    provide, to a user equipment (UE), an indication of the virtual cell identity, the virtual cell identity for use by the UE in generating a demodulation reference signal parameter based on the virtual cell identity;
    provide, to the UE, an indication of the seed, wherein a cyclic shift parameter for use in determination of a cyclic shift for a demodulation reference signal is based on the seed.

9. The eNB of claim 8, wherein the determination of the cyclic shift includes derivation of the cyclic shift based on the cyclic shift parameter.

10. The eNB of claim 8, wherein:
  the first circuitry is to further select a cyclic shift hop initialization value different from the virtual cell identity; and
  the second circuitry is to further provide, to the UE, an indication of the cyclic shift hop initialization value, the cyclic shift hop initialization value for use in generation of a cyclic shift for a demodulation reference signal.

11. The eNB of claim 10, wherein the generation of the cyclic shift for the demodulation reference signal includes initialization of a pseudo-random sequence generator with the cyclic shift hop initialization value.

12. The eNB of claim 10, wherein the indication of the cyclic shift hop initialization value is provided via a radio resource control signal.

13. The eNB of claim 8, wherein the indication of the virtual cell identity is provided via a radio resource control signal.

14. The eNB of claim 8, wherein the seed is independent from the virtual cell identity and the physical layer cell identity.

15. A user equipment (UE), comprising:
  first circuitry to identify a UE-specific acknowledge and negative-acknowledge (AN) resource offset from a received indication of the UE-specific AN resource offset, wherein the UE-specific AN resource offset is different from a virtual cell identity used by the UE to generate a demodulation reference signal parameter; and
  second circuitry to determine a physical uplink control channel (PUCCH) resource based on the UE-specific AN resource offset, the PUCCH resource to be used for transmission of AN transmissions.

16. The UE of claim 15, further comprising:
  third circuitry to transmit an AN transmission in the determined PUCCH resource.

17. The UE of claim 15, wherein the indication of the UE-specific AN resource offset is received via a radio resource control signal.

18. An evolved NodeB (eNB), comprising:
  first circuitry to select a user equipment (UE)-specific acknowledge and negative-acknowledge (AN) resource offset for a physical uplink control channel (PUCCH), wherein the UE-specific AN resource offset is different from a virtual cell identity used by the UE to generate a demodulation reference signal (DM-RS) parameter; and
  second circuitry to provide, to the UE, an indicator of the AN resource offset, the UE-specific AN resource offset for use in determination of a PUCCH resource for the AN transmissions based on the AN resource offset.

19. The eNB of claim 18, further comprising third circuitry to receive an AN transmission from the UE in the determined PUCCH resource.

20. The eNB of claim 18, wherein the indicator of the UE-specific AN resource offset is provided via a radio resource control signal.

* * * * *